United States Patent
Sadri et al.

(10) Patent No.: US 6,213,699 B1
(45) Date of Patent: Apr. 10, 2001

(54) FILLING RIVET WITH HIGH PIN LOCK

(75) Inventors: Shahriar M. Sadri, San Clemente; Lloyd Parker, Jr., Corona, both of CA (US); Gerhart Hufnagl, Tucson, AZ (US)

(73) Assignee: Huck International, Inc., Tucson, AZ (US)

( * ) Notice: Subject to any disclaimer, the term of this patent is extended or adjusted under 35 U.S.C. 154(b) by 0 days.

(21) Appl. No.: 09/393,428

(22) Filed: Sep. 10, 1999

(51) Int. Cl.$^7$ .............................. F16B 13/04; F16B 13/06
(52) U.S. Cl. .................................. 411/43; 411/34; 411/69
(58) Field of Search ................... 411/34–38, 43, 411/69, 70

(56) References Cited

U.S. PATENT DOCUMENTS

| | | |
|---|---|---|
| 2,538,623 | 1/1951 | Keating . |
| 3,288,016 | 11/1966 | Reynolds . |
| 3,292,482 | 12/1966 | Fry et al. . |
| 3,298,725 | 1/1967 | Boteler . |
| 3,377,907 | 4/1968 | Hurd . |
| 3,390,601 | 7/1968 | Summerlin . |
| 3,515,419 | 6/1970 | Baugh . |
| 3,702,088 | 11/1972 | Schmitt . |
| 4,046,053 | 9/1977 | Alvi et al. . |
| 4,089,249 * | 5/1978 | Binns ................................. 411/43 X |
| 4,355,934 | 10/1982 | Denham et al. . |
| 4,405,273 | 9/1983 | Ruhl et al. . |
| 4,627,775 | 12/1986 | Dixon . |
| 4,639,174 | 1/1987 | Denham et al. . |
| 4,781,500 | 11/1988 | Mauer . |
| 4,789,283 | 12/1988 | Crawford . |
| 4,846,611 | 7/1989 | Sadri et al. . |
| 4,863,325 | 9/1989 | Smith . |
| 4,904,133 | 2/1990 | Wright . |
| 4,969,785 | 11/1990 | Wright . |
| 5,054,977 | 10/1991 | Schultz . |
| 5,102,274 * | 4/1992 | Norton et al. ........................ 411/43 |
| 5,286,151 | 2/1994 | Eshraghi . |
| 5,503,510 | 4/1996 | Golan . |
| 5,810,530 | 9/1998 | Travis . |

* cited by examiner

*Primary Examiner*—Neill Wilson
(74) *Attorney, Agent, or Firm*—Harness, Dickey & Pierce P.L.C.

(57) ABSTRACT

A two piece blind fastener for securing a plurality of workpieces including a hollow sleeve having a straight shank with an enlarged sleeve head at one end and a pin having an enlarged pin head; the pin has a pin stop shoulder and a lock groove located near the pin stop shoulder; the pin head is adapted to engage the sleeve to form a bulb type blind head in response to a relative axial force applied between the pin and sleeve; the pin stop shoulder is adapted to engage a sleeve stop shoulder to direct the material of the sleeve stop shoulder substantially radially inwardly into the lock groove to lock the pin and sleeve together and to finally form a stop surface on the sleeve for stopping axial movement of the pin through the sleeve; in addition the pin has an expander portion adapted to expand the sleeve shank radially outwardly to fill the openings of the workpieces and with the expander portion having a grooved section with alternate relief grooves and expander segments with the relief grooves receiving excess material of the sleeve after hole fill and to thereby also assist in locking the pin and sleeve together.

30 Claims, 5 Drawing Sheets

FILLING RIVET WITH HIGH PIN LOCK

BACKGROUND OF THE INVENTION

The present invention relates to blind fasteners and more particularly to blind fasteners including a pin and a sleeve and having a mechanical lock structure for locking the pin and sleeve together and providing a hole fill of the openings of workpieces being secured together.

In many blind fastener applications it is desirable that the pin and sleeve be mechanically locked together to inhibit loosening, separation and/or loss of the pin through vibration, etc. Examples of such blind fasteners can be seen in the U.S. Pat. No. 4,863,325 for Two Piece Blind Fastener With Lock Spindle Construction Issued on Sep. 5, 1989 to Smith, U.S. Pat. No. 4,046,053 for Blind Rivet issued on Sep. 6, 1977 to Alvi et al, U.S. Pat. No. 3,288,016 for Blind Two-Piece Fastener issued on Nov. 29, 1966 to Reynolds, and U.S. Pat. No. 2,538,623 for Rivet Assembly issued on Jan. 16, 1951 to Keating.

It is also desirable in many applications to fill the workpiece openings. This is frequently done by radially expanding and compressing the shank of the sleeve against the surface of the workpiece openings by an expander portion of the pin. Various forms of such structures are also shown in the patents noted above.

BRIEF SUMMARY OF THE INVENTION

In the present invention a blind fastener, including a pin and a sleeve, is provided in which an internal portion of the sleeve is moved radially inwardly during installation by a portion of the pin into a lock pocket groove on the pin to form a primary lock holding the pin and sleeve together.

In addition, the pin has an elongated expander portion which operates with the portion of the sleeve shank in the workpiece openings to radially expand that sleeve portion to fill the workpiece openings. The sleeve shank portion is formed with a volume of material which in combination with the volume of the expander pin portion defines a volume greater than that required to fill the workpiece openings. At the same time, the expander pin portion is formed with a grooved section having plurality of axially extending, circumferentially disposed relief grooves separated by co-extensively extending expander segments located in a common circular plane. The relief grooves are adapted to receive the excess material of the sleeve shank portion after hole fill caused by the expander pin portion. The hole fill is caused primarily, by the expander segments and by a straight, circumferentially continuous, straight expander segment at the leading end of the expander grooved section. In this regard, the expander portion is provided to be of a length such that the relief grooves will extend partially past the inner or blind side workpiece surface of the workpieces to thereby provide additional volume to receive excess sleeve shank material. This provides an increased tolerance range for dimensional variations in the workpiece openings and related fastener while still providing a desired magnitude of compression of the expanded collar material against the workpiece openings over the increased tolerance range. In this regard an excess magnitude of compression cr an insufficient magnitude of compression could have an adverse affect on the installation, performance and/or strength of the fastener and fastened joint. For example an excessive volume could cause axial movement of the sleeve head away from engagement with the adjacent work piece surface resulting in an unsatisfactory, weakened joint. This type of occurrence is frequently referred to as "head rise". This is inhibited by the present invention. In addition to providing the increased tolerance range noted, the relief grooves are also formed to provide an additional or secondary lock between the pin and sleeve by virtue of the sleeve material flowing into the relief grooves during hole fill. This increases the overall lock between the pin and sleeve.

At the same time the extra lock provides additional resistance to "pin bounce" and its adverse effects which can occur as a result of severing the pin tail or pull portion of the pin by fracturing of a breakneck groove.

In the present invention the expander portion of the pin has a generally circular cross-section. The relief grooves are generally shallow and are of a generally arcuate contour. The expander segments separating each of the grooves are in a circular plane of the overall circular contour of the expander portion with both the expander segments and grooves being wide and generally of the same circumferential width. As will be seen this structure enhances the expansion capability of the expander portion while substantially resisting distortion.

In addition, the unique structure of the expander portion also enhances the work hardening and hence strength of the expanded sleeve shank portion in the workpiece openings arid additionally provides significant work hardening and hence strength to the material of the workpieces at the workpiece openings which are subject to hole fill. This provides substantially improved static strength and fatigue life of the fastener, the workpieces and hence of the fastened joint.

Thus it is an object of the present invention to provide a novel two piece blind fastener, including a pin and a sleeve, and in which the pin and sleeve are adapted to provide hole fill of the workpiece openings and are mechanically locked together by material from the sleeve which is moved radially inwardly into a lock pocket in the pin and with an additional lock formed by the excess material from the expanded shank portion of the sleeve moved into relief grooves in the expander portion of the pin shank from hole fill.

It is still another object of the present invention to provide a novel two piece fastener, including a pin and a sleeve, and in which a shank portion of the sleeve is adapted to be radially expanded by the pin into compressive engagement with the workpiece openings and with the pin having a structure for expanding the sleeve shank portion and which is adapted to accept excess sleeve material from the compressive engagement in expansion whereby the fastener can be used to secure workpieces having an increase in the range of tolerance variations in the size of the workpiece openings.

It is a further object of the present invention to provide a novel two piece fastener, including a pin and a sleeve, and in which a shank portion of the sleeve is adapted to be radially expanded by an expander portion of the pin into compressive engagement with the workpiece openings and with the expander portion having a plurality of axially extending generally wide relief grooves circumferentially separated by relatively wide expander segments with the relief grooves adapted to accept excess sleeve material from the compressive engagement in expansion generally without distortion of the ridges whereby the fastener can be used to effectively secure workpieces having an increase in the range of tolerance variations in the size of the workpiece openings and fastener components while resulting in increased static strength and fatigue life of the fastened joint.

It is another object of the present invention to provide a novel, dual mechanical locking structure for the pin and sleeve of a two piece blind fastener and having an increased tolerance range for filling related workpiece openings.

It is a general object of the present invention to provide a new and improved two piece blind fastener.

Other objects, features, and advantages of the present invention will become apparent from the subsequent description and the appended claims, taken in conjunction with the accompanying drawings, in which:

DETAILED DESCRIPTION OF THE INVENTION

Figure 1:
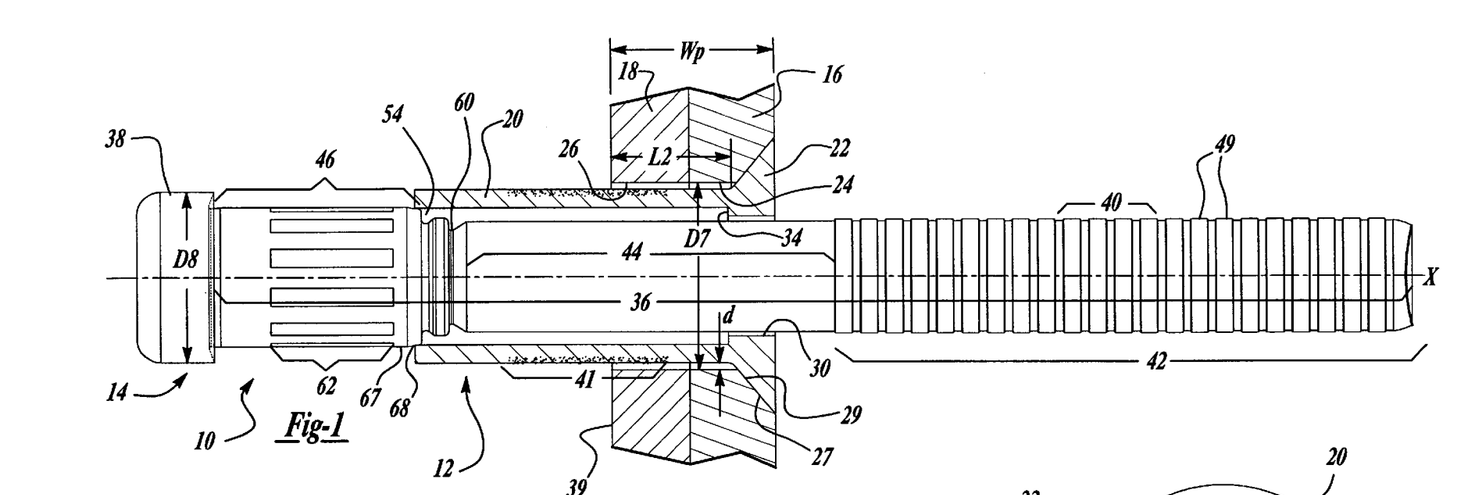
FIG. 1 is a side elevational view with some parts shown in section of a blind fastener, including a pin and a sleeve embodying features of the present invention and with the pin and sleeve being in an initially pre-assembled relationship together and assembled with workpieces to be secured prior to initiation of installation.

As can be seen in FIG. 1, a blind fastener 10, includes a hollow sleeve 12 and a pin 14 which are shown in a pre-assembled relationship to facilitate handling and as pre-assembled to workpieces 16 and 18.

Figure 2:
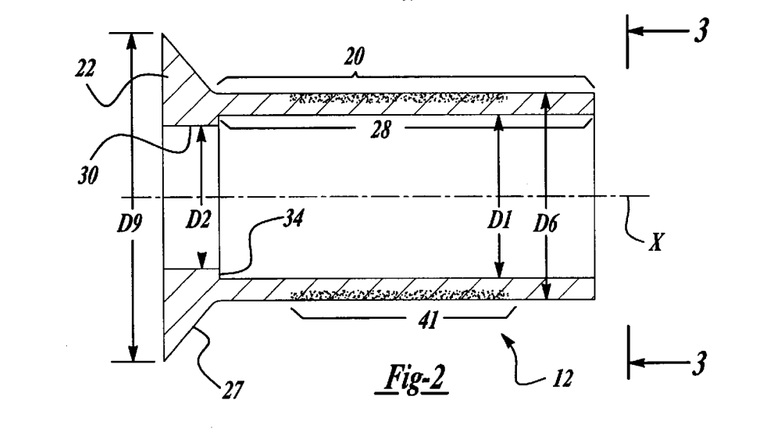
FIG. 2 is a side elevational, longitudinal sectional view of the sleeve of FIG. 1.
Figure 3:
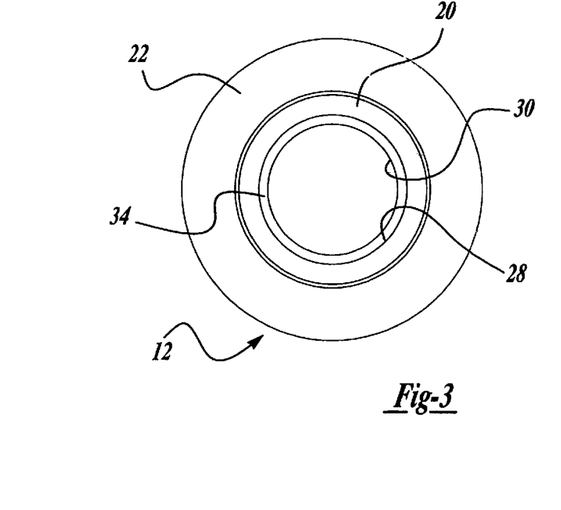
FIG. 3 is an elevational end view of the sleeve of FIGS. 1 and 2 taken generally in the direction of the Arrows 3—3 in FIG. 2.
Figure 4:
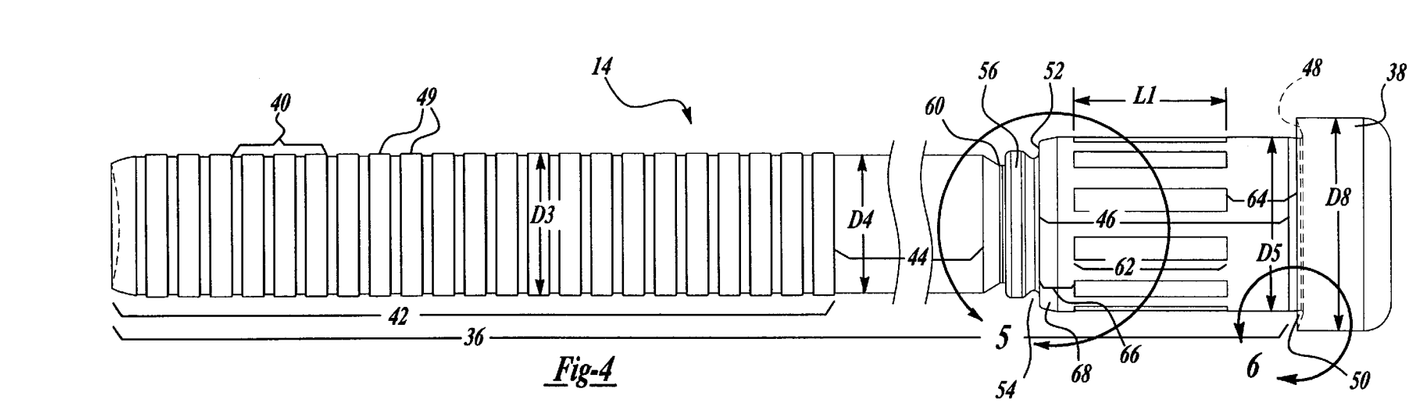
FIG. 4 is a side elevational view of the pin of FIG. 1.

Looking now to FIGS. 1–3, the hollow sleeve 12 has a generally straight shank 20 of a uniform outside diameter D6 which terminates at its forward end in an enlarged head 22.

As can be seen in FIG. 1, the sleeve shank 20 is adapted to fit in clearance relationship in through bores or aligned openings 24 and 26 in workpieces 16 and 18, respectively. The enlarged head 22 is of a conical, flush head type construction and has a tapered inner surface 27 which tapers radially inwardly from a head diameter D9 and is adapted to fit matingly within a tapered countersunk opening 29 at the outer end of bore 24 in workpiece 16. While a conical, flush head 22 is shown it should be understood that the present invention is equally applicable to a sleeve having a protruding head.

Sleeve 12 has a central through bore which includes a shank bore portion 28, having a diameter D1, which extends generally uniformly for the length of the sleeve shank 20 and communicates proximate the enlarged sleeve head 22 with a generally uniform, reduced diameter bore portion 30, of a diameter D2. An annular stop shoulder 34 is defined at the juncture of shank bore portion 28 and the reduced diameter bore portion 30. The stop shoulder 34 extends radially inwardly substantially transversely to the central axis X of the sleeve 12 and pin 14 of the fastener 10.

Figure 7A:
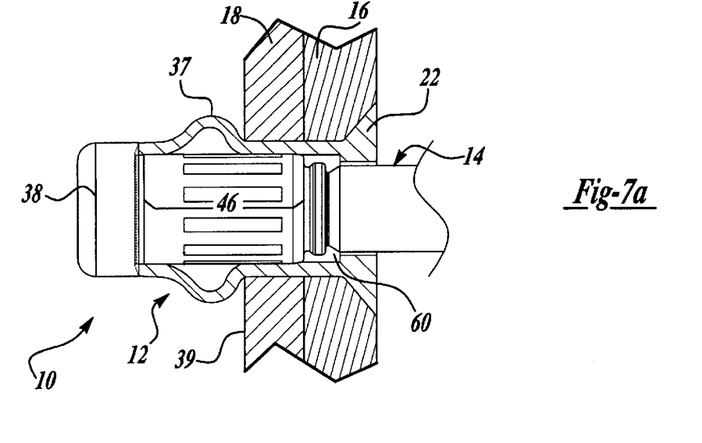
FIGS. 7a, 7b and 7c are sequence views of the fastener and workpieces of FIG. 1 and depicting the fastener in the progressive stages of installation after the initial pre-assembly in FIG. 1 prior to initiation of installation to subsequent sequential stages of installation in FIGS. 7a and 7b to completion of installation at FIG. 7c.
Figure 7B:
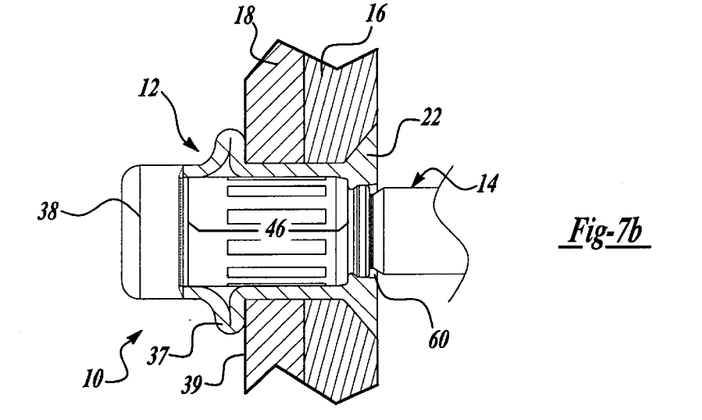
Figure 7C:
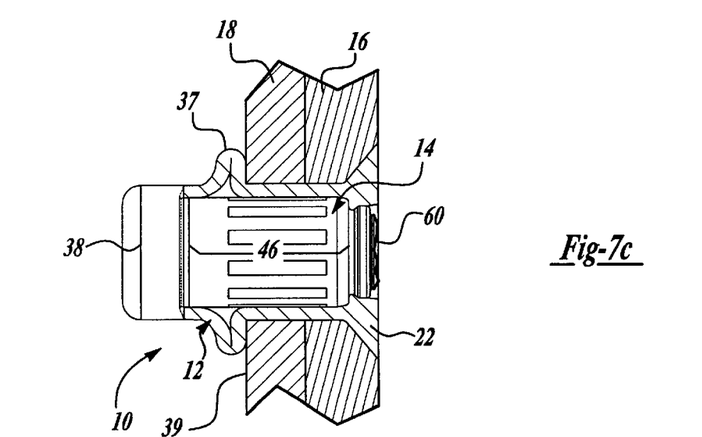

As will be seen, it is desirable that a blind head be formed by upsetting the sleeve shank 20 radially outwardly at a point along its length to form a bulbed blind head 37 as shown in FIG. 7c. The blind head 37, however, is to engage the blind side, inner surface 39 of the workpiece 18 and this is to occur over a range of total thickness Wp of the workpieces 16 and 18 able to be secured by one size of the fastener 10. This is referred to as the "grip range" for that fastener. To achieve this, the sleeve shank 20 is band annealed over an intermediate section 41 to provide a gradient of reduced hardness. In this regard the sleeve 12 is formed by cold heading blanks which results in an increase in hardness of the material in the sleeve shank 20 from cold working; this hardness is reduced in the intermediate section 41 by band annealing as noted. This then facilitates bulbing in the section 41 to form the blind head 37 having the desired bulbed configuration in clamping engagement with the blind side surface 39. The section 41 extends generally from a location to be proximate to the blind side surface 39 rearwardly to provide an ample range for formation of the bulbed blind head 37 over the desired range of the overall workpiece thickness Wp.

Looking now to FIGS. 1, 4, 5, 5a–5c and 6 the pin 14 has an elongated shank 36 which terminates in an enlarged pin head 38 at its rearward end (the blind end of fastener 10); the shank 36 of pin 14 has a plurality of annular pull grooves 40 in a pull groove portion 42 at the opposite end connected to a smooth shank portion 44. The shank 36 includes an expander pin portion 46 connected at one end to the pin head 38.

Since the pull grooves 40 are formed by roll forming on an extension of the smooth shank portion 44, the diameter D3 of the crests 49 of the pull grooves 40 is slightly greater than the diameter D4 of the smooth shank portion 44. At the same time the diameter D5 of the expander pin portion 46 is greater than diameters D3 and D4 of the crests 49 of pull grooves 40 and of the smooth shank portion 44, respectively. The diameters D3 and D4 of pin shank portions 42 and 44 are less than the small diameter D2 of the reduced diameter bore portion 30 of sleeve 12 whereby the shank portions 42 and 44 can pass freely through the sleeve 12. On the other hand the diameter D5 of expander pin portion 46 is greater than the diameter D1 of the shank bore portion 28 to provide a predetermined amount of sleeve shark expansion during installation resulting in hole fill of the bores 24 and 26 of workpieces 16 and 18, respectively, in a manner to be described. In this regard the outside diameter D6 of the straight sleeve shank 20 is less than the diameter D7 of workpiece bores 24 and 26 to provide a radial clearance distance d, i.e. ½ (D7–D6), see FIG. 1. As will be seen the present invention provides effective hole fill and fastener installation over an increased range in clearance d.

Figure 6:
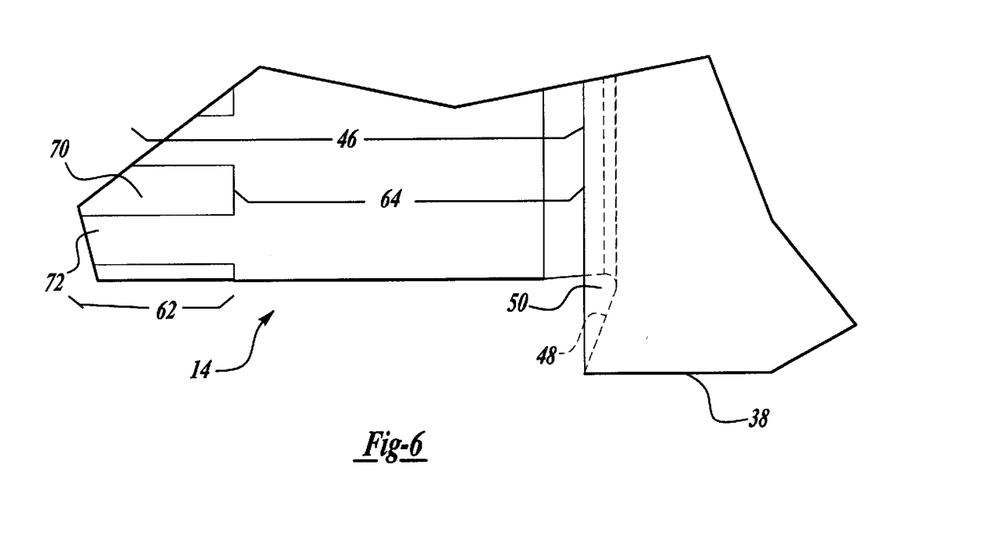
FIG. 6 is a fragmentary view to enlarged scale taken generally in the Circle 6 in FIG. 4 and depicting a portion of the enlarged head of the pin.

Looking now to FIG. 6, the pin head 38 has a radially inwardly, axially rearwardly tapered guide surface 48 which defines an annular cavity 50 within the head 38. The guide surface 48 is essentially planar extending radially inwardly and axially rearwardly at an angle A1 relative to a plane transverse to the axis X. The outside diameter D8 of the pin head 38 is generally around that of the outside diameter D6 of the sleeve shank 20 and thus, in installation, the outer or free end of the sleeve shank 20 will be engaged by the tapered pin guide surface 48 and thereby guided radially inwardly into the pin cavity 50. Thus this guiding action inhibits movement of the sleeve shank 20 radially outwardly over the pin head 38 and thereby assists in the formation of the blind head in a desired bulbed configuration to be described. See bulbed blind head 37 in FIG. 7c.

An annular pin stop shoulder 52 is defined at the end of the expander pin portion 46 and is generally planar. (See FIG. 5). A lock pocket groove 54 is defined by an annular groove of a reduced diameter D10 located immediately adjacent the sleeve pin stop shoulder 52 with the outer end of the lock pocket groove 54 being defined by an annular land 56. Axially outwardly from the lock pocket 54 and adjacent to the annular land 56 is an annular breakneck groove 60 of a reduced diameter D11 which defines the weakest section of the pin 14. The inner end of the breakneck groove 60 is at a planar surface at the outer end of the land 56. Both the pin stop shoulder 52 and inner surface of the breakneck groove 60 are in planes transverse to the axis X of pin 14 or slightly angulated axially rearwardly and radially outwardly, i.e. at angles A2 and A3, respectively, relative to such transverse planes. (See FIG. 5c). In addition the lock pocket groove 54 is formed with a relatively large included angle A5. This construction facilitates rolling of the lock pocket groove 54 and breakneck groove 60. At the same time the angles A2, A3 and A5 are selected to inhibit extrusion during installation and to provide for a clean break line at the breakneck groove 60 upon fracture at the completion of installation.

Looking now to FIGS. 4, 5, 5a, 5b and 6 the expander pin portion 46 is of a circular cross section. The expander pin portion 46 comprises a grooved section 62 which is connected at one end to the pin head 38 by a first, inner smooth section 64 and at the other end to the stop shoulder 52 by a second, outer smooth section 66. The second, outer smooth section 66 terminates in a tapered lead-in segment 68 at its outer end. The grooved section 62, and first and second smooth sections 64 and 66 are substantially of the same diameter D5 except for the lead-in segment 68. The lead-in segment 68 tapers radially inwardly at an angle A4 relative to the axis X. The taper angle A4 is selected to facilitate initial movement of the expander pin portion 46 into the free end of the sleeve shank 20 and at the same time facilitates the radial outward expansion of the sleeve shank 20 at an acceptable relative axial force for installation. In this regard the lead-in segment 68 formed as noted avoids galling of the inside surface of shank bore portion 28.

In this regard and as noted, the diameter D5 of the expander pin portion 46 is larger than the diameter D1 of the bore portion 28 of sleeve shank 20. However, in the pre-assembly together of the sleeve 12 and pin 14 the tapered lead-in segment 68 of the expander pin portion 46 is located only partially in interference within the bore portion 28 and while holding the sleeve 12 and pin 14 together to facilitate handling prior to installation it does so without excessive expansion of the sleeve 12 whereby insertion of the pre-assembled fastener 10 into workpiece openings 24 and 26 is not inhibited (see FIG. 1). In this regard, it is believed that the outer surface of the sleeve shank could be slightly tapered to a reduced thickness at the open end to accommodate such pre-assembly without creating interference with workpiece openings 24 and 26 upon initial insertion.

Figure 5:
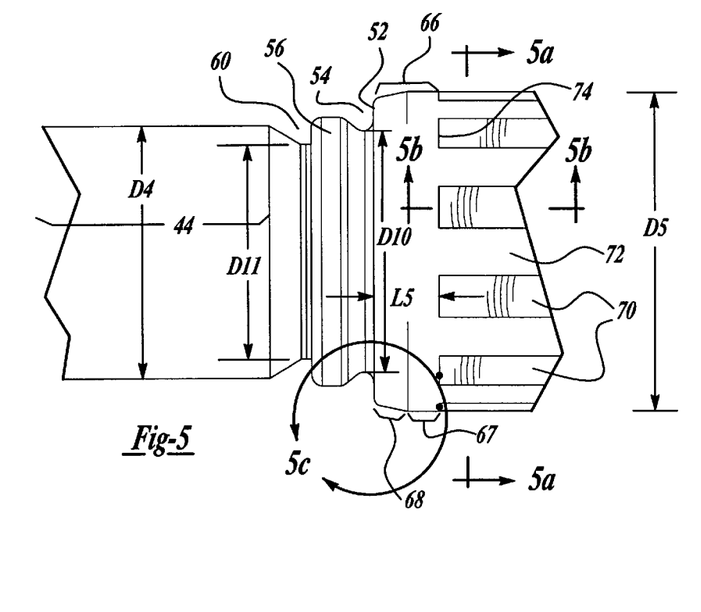
FIG. 5 is a fragmentary view to enlarged scale of the portion of the pin of FIG. 4 taken generally in the Circle 5 in FIG. 4.
Figure 5A:
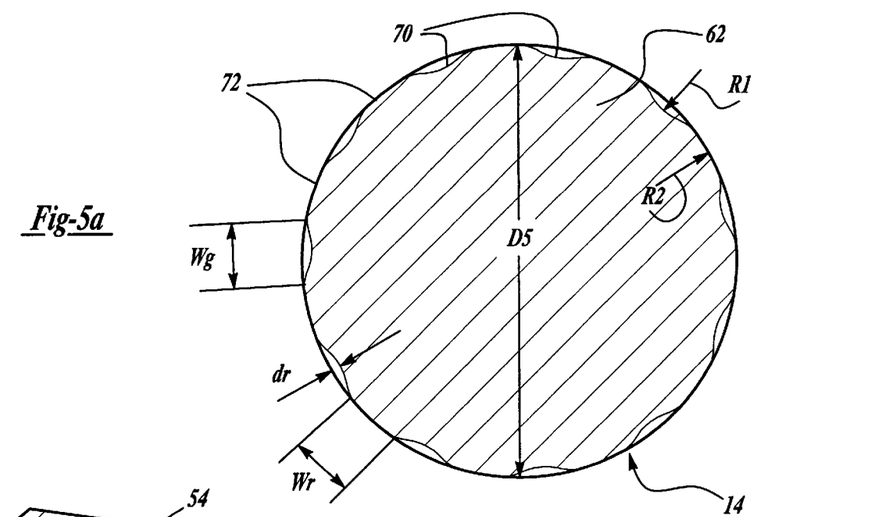
FIG. 5a is a sectional view to enlarged scale of the pin of FIGS. 4 and 5 taken generally in the direction of Arrows 5a—5a in FIG. 5 and depicting the contour of the relief grooves and expander segments of the expander pin portion of the pin with the relief grooves adapted to receive an excess of material of the sleeve shank from expansion in hole fill.

The grooved section 62 is formed to have axially extending relief grooves 70 and expander segments 72. The grooves 70 are relatively shallow and have an arcuate contour with a generous radius R1 and with a shallow radial depth of dr. The expander segments 72, however, are maintained with a curvature of the overall diameter D5 being a radius R2. The relief groove radius R1 blends smoothly with the arcuate contour of the overall radius R2 of the expander segments (i.e. R2=½ D5). In this regard, in one form of the invention the radius R1 was selected to be around 30% of the radius R2. At the same time the radial depth dr of the shallow relief grooves 70 was between around 2% to around 2.5% of the overall diameter D5. Thus the curvature of the relief grooves 70 is selected to facilitate the flow of the excess sleeve material from hole fill while at the same time the relatively shallow construction assists in maintaining the compression of the sleeve material in the grooves 70 against the inner surfaces of the workpiece openings 24, 26.

As noted the relief grooves 70 are relatively wide circumferentially and thus the circumferential groove width Wg is substantially equal to the circumferential width Wr of the expander segments 72. At the same time, in one form of the invention, the width Wg of relief grooves 70 and width Wr of expander segments 72 extend circumferentially for around 16° each. In this regard, the volume of the grooves 70 is selected to be slightly less than the volume of sleeve material, in combination with the volume of the expander pin portion 46, which is in excess of that required to fill the radial gap d at the end of the dimensional tolerance range where d is a minimum. At the same time the relief grooves 70 will be at least partially filled when filling the radial gap d at the other end of the dimensional tolerance range where d is a maximum.

As noted, the outer smooth section 66 terminates in the tapered lead-in segment 68 at the leading end of the expander pin portion 46. The smooth section 66 has a straight segment 67 which is of the fill diameter D5. The smooth section 66 is of a relatively short axial length L5 and in this regard in one form of the invention the axial length L5 was about 20% of the expansion diameter D5. At the same time the tapered lead-in segment was generally around 50% of the length L5. This still left a short, limited length for the straight segment 67. It is believed that this short, straight segment 67 provides a limited, desired length of full circumferential expansion of the sleeve shank 20 prior to the engagement by the grooved section 62. The limited segment 67 then initially provides uniform hole fill of the workpiece openings 24 and 26 and facilitates flow of the excess sleeve material into the relief grooves 70. At the same time the combination of the smooth surface of the straight segment 67 and the generally uniform, circumferentially wide surfaces of the expander segments 72 inhibit cutting of grooves or notches in the engaged, expanded surface of the sleeve shank 20.

The overall axial length L1 of the grooved section 62 is selected such as to be substantially fully in line with the straight workpiece bores 24 and 26 in the condition of maximum grip where the total thickness Wp of the workpieces 16, 18 is a maximum for the fastener 10 and with the length L2 of the straight portions of workpiece bores 24 and 26 being generally less than the length L1 of the grooved section 62. In this regard the length L1 of the grooved section 62 is selected such that it will extend partially past the blind side surface 39 even in a maximum grip condition, i.e. where the combined thickness Wp is a maximum for that fastener. This provides an additional volume of relief grooves 70 to receive excess sleeve material in conditions where the radial gap d is at a minimum. In the drawings of FIGS. 1 and 7a–7c the thickness Wp of the workpieces 16 and 18 is shown generally at a nominal value in the grip range between the minimum and maximum magnitude of the total thickness Wp.

The relief grooves 70 are formed by rolling a straight pin shank portion of the diameter D5. As the grooves 70 are formed the material displaced in forming the grooves 70 moves substantially in axial elongation whereby the diameter D5 is maintained overall for the expander pin portion 46, i.e. for the expander segments 72 of the grooved section 62 and the first and second smooth sections 64 and 66 up to the tapered lead-in segment 68. The pin 14 is then heat treated after rolling to provide a uniform desired hardness.

Figure 5B:
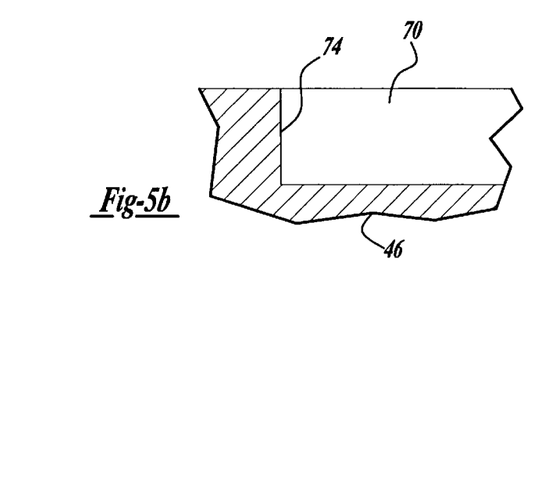
FIG. 5b is a fragmentary sectional view to enlarged scale taken generally in the direction of the Arrows 5b—5b in FIG. 5 and further depicting the contour of the relief grooves of the expander pin portion of the pin.
Figure 5C:
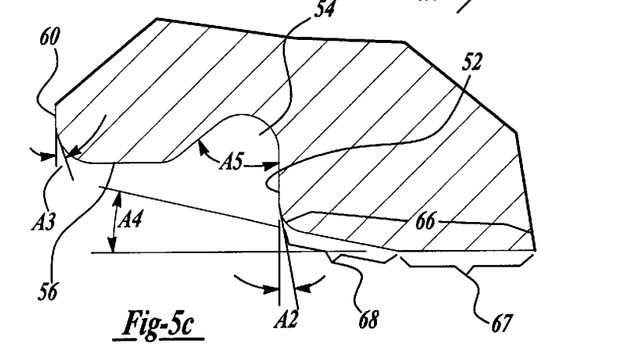
FIG. 5c is a fragmentary view to enlarged scale of the lead-in segment of the expander pin portion taken generally in the Circle 5c FIG. 5.

Looking now to FIG. 5b the leading end of the relief grooves 70 terminates in a generally planar end surface 74 which is generally transverse to the axis X. This creates an abutment for the excess material which flows into the relief grooves 70. Thus the abutment creates a secondary lock resisting push out of the pin 14 from the sleeve 12 and assists in holding the pin 14 and sleeve 12 of fastener 10 together after installation.

The fastener 10 is adapted to be set by an installation tool which can be of a type well known in the art and hence the details thereof have been omitted for simplicity. However, it should be noted that the tool has a chuck jaw assembly which is adapted to grippingly engage the pull grooves 40 of the pin 14 while an anvil engages the enlarged sleeve head 22. Upon actuation of the tool, the jaw assembly moves axially away from the anvil whereby a relative axial force is applied between the pin 14 and sleeve 12.

As this relative axial force increases in magnitude, the pin 14 is pulled into the sleeve 12 and the expander pin portion 46 is moved into the end of the sleeve shank 20 until the pin head 38 engages the outer end of the sleeve shank 20. At this point the annealed section 41 of sleeve shank 20 begins to bulb radially outwardly to initiate formation of a bulbed blind head 37. (See FIG. 7a). As this occurs the expander pin portion 46 is moved into the sleeve bore portion 28 with the tapered lead-in segment 68 assisting in piloting of the expander pin portion 46 into the sleeve bore portion 28 while facilitating radial expansion of the sleeve shank 20.

As axial movement of the pin 14 continues the pin stop shoulder 52 engages the sleeve stop shoulder 34 moving material from the sleeve stop shoulder 34 radially inwardly into the lock pocket groove 54. After the lock pocket groove 54 has been substantially filled, movement of the pin 14 is arrested. At this point the bulbed blind head 37 has been fully formed and is in clamping engagement with the blind side, inner surface 39 of workpiece 18. (See FIG. 7b). Now as the relative axial force applied between the pin 14 and sleeve 12 increases a force of preselected magnitude is reached at which the pin 14 is fractured at the breakneck groove 60 and the pull groove portion 42 is removed. This then completes the installation. (See FIG. 7c). At the same time the secondary lock formed by the sleeve material which has flowed into the relief grooves 70 assists the primary lock by the sleeve material in the lock pocket 54 to resist loosening of the pin 14 and sleeve 12 from pin bounce occurring at fracture of the breakneck groove 60. This improves the static strength of the fastened joint.

Note that the breakneck groove 60 and pin stop shoulder 52 are separated by a preselected distance such that when the pin stop shoulder 52 is held from farther axial movement by the sleeve stop shoulder 34, the breakneck groove 60 will be located within the sleeve bore portion 30 such that upon fracture the outer, fractured end of the pin 14 will generally not extend beyond the adjacent outer surface of the sleeve head 22.

The volume of the material of the sleeve stop shoulder 34 is selected relative to the volume of the lock groove 54 such that the lock groove 54 will be substantially filled and axial movement of the pin 14 will be stopped at the desired location generally when that filled condition occurs, i.e. such that pin break at breakneck 60 occurs within the sleeve head 22. Thus the volume of sleeve stop shoulder 34 is generally greater than the volume necessary to fill the lock groove 54.

The sleeve head 22 provides radial stiffness and resists any tendency for radial expansion of sleeve 12 as the sleeve stop shoulder 34 is deformed into the lock groove 54. In this regard the breakneck groove 60 is designed to fracture at an axial load greater than that load at which the filling of the lock groove 54 occurs; thus after filling, the additional axial force necessary for pin break could urge the sleeve material to radially expand the sleeve 12. This radial displacement of sleeve material could result in axial movement of the pin 14 making its final position more difficult to control. By locating the sleeve stop shoulder 34 substantially within the confines of the sleeve head 22, such radial expansion is inhibited. At the same time, it should be noted that only the tapered lead-in segment 68 and perhaps a part of the straight segment 67 will move into the area of the sleeve head 22. This spaces the grooved section 62 away from the sleeve head 22 thereby preventing deterioration in the strength of the sleeve 12 in the vicinity of the connection between the sleeve head 22 and sleeve shank 20.

In this regard it is also believed desirable to have the lock groove 54 located very close and/or contiguous to the pin stop shoulder 52 in order to promote the effectiveness of its fill by the material of the sleeve stop shoulder 34. It is also believed desirable that the forwardmost wall 76 of the lock groove 54 be axially spaced as far as possible from the breakneck groove 60 with both, of course, located substantially within the confines of the sleeve head 22 for reasons previously described.

The above construction promotes good filling of the lock groove 54 and also minimizes variations in the axial position of the pin 14 at which the lock groove 54 is filled and the shoulder stop is formed and hence permits consistency of location of the fracture of the breakneck groove 60 within the confines of sleeve head 22.

In one form of the invention the pin 14 was made of A286 stainless steel having a hardness of around 44 Rc and sleeve 12 was made of C.P.Ti, i.e. commercially pure titanium, having a general hardness of 96 Rb. Alternatively the pin 14 could be made of a titanium alloy such as 6Al–4V (Aluminum/Vanadium) while the sleeve 12 could be made of a titanium alloy such as 3Al–2.5V or A286 stainless steel.

As noted the sleeve 12 is work hardened during formation by cold heading from a blank such as to increase the hardness of the sleeve shank 20 and after that the sleeve shank 20 is band annealed in a limited area to provide the band annealed section 41. This facilitates formation of the bulbed blind head 37 at the desired location at the blind side surface 39 of workpiece 18. In addition to the tapered lead-in segment 68 frictional affects can be further reduced by the use of a light coat of a lubricant on the pin 14 such as Kalgard FA, which is a trademarked product.

In aircraft applications the workpieces 16 and 18 are typically made of a lightweight material such as a 2024 T3 clad aluminum alloy or generally of aluminum alloys in the 2,000 or 7,000 series or of a titanium alloy. Thus the area around the workpiece openings 24 and 26 will be work hardened to an increased hardness by the compression of the expanded section of the sleeve shank 20. In addition the segment of the band annealed section 41 which is located in and expanded and compressed in the workpiece openings 24 and 26 will also be work hardened to an increased hardness.

It should also be noted that the lock mechanisms of fastener 10 are performed by the interaction of pin 14 and sleeve 12 and are not dependent upon any special construction of the installation tool. However, the installation tool should preferably have a flat anvil surface adapted to engage the outer surface of the sleeve head 22. In this regard while the fastener 10 is shown as being of a two piece construction, i.e. with sleeve 12 and pin 14, it should be understood that a disposable anvil type load washer, such as shown in U.S. Pat. No. 5,810,530 issued Sep. 22, 1998 to Travis for Interference Blind Type Bolt and U.S. Pat. No. 4,789,283 issued Dec. 6, 1988 to Crawford for Fluid-Tight Blind Rivet, could be used to engage the sleeve head 22 to react the relative axial load applied to the sleeve 12.

A list of representative typical values for one form of the sleeve 12 and pin 14 of fastener 10 is noted in the chart which follows. It should be understood that the following values are by way of example and that the principles of the present invention can be employed for fasteners of different sizes, dimensions, materials and the like with the noted values changing.

CHART OF TYPICAL VALUES - INCHES AND DEGREES
SLEEVE 12

| Material | Hardness Shank 20 General - Pre-Anneal | D1 Bore Portion 28 | D2 Bore Portion 30 | D6 Sleeve Shank 20 | D9 Sleeve Head 22 | Minimum Hardness Annealed Section 41 |
|---|---|---|---|---|---|---|
| C.P. Titanium | 96 Rb | 0.147 | 0.129 | 0.185 | 0.300 | 70 Rb |

PIN 14

| Material | Hardness | D3 Pull Crests 49 | D4 Smooth Shank 44 | DS Expander Portion 46 | D8 Pin Head 38 | A1 Guide Surface 48 |
|---|---|---|---|---|---|---|
| A286 S.S. | 44 Rc | 0.124 | 0.120 | 0.152 | 0.185–.186 | 80° |
| A2 Stop Shoulder 52 | A3 b'neck groove 60 | D10 Lock Groove 54 | D11 b'neck Groove 60 | A4 Lead-in Segment 68 | R1 Relief Grooves 70 | R2 Expander Segments 72 |
| 0°–2° L1 Grooved Section 62 | 0°–5° A5 Lock Pocket Included Angle | 0.116 Wg Width Relief Groove 70 | 0.098 Wr Width Expander Segment 72 | 10° dr Radial Depth | 0.023 dr/D5 | 0.076 L5 |
| 0.135 | 50° | 16° | 16° | .003 | 2–2.5% | .031 |

WORKPIECES 16, 18

| Material | D7 Workpiece Bores 24,26 | Clearance d 1/2 (D7-D6) | Wp Thickness Workpieces 16, 18 |
|---|---|---|---|
| 2024 T3 Clad Al | 0.188 | .0015 | 0.125–0.188 |

Figures 8, 9:
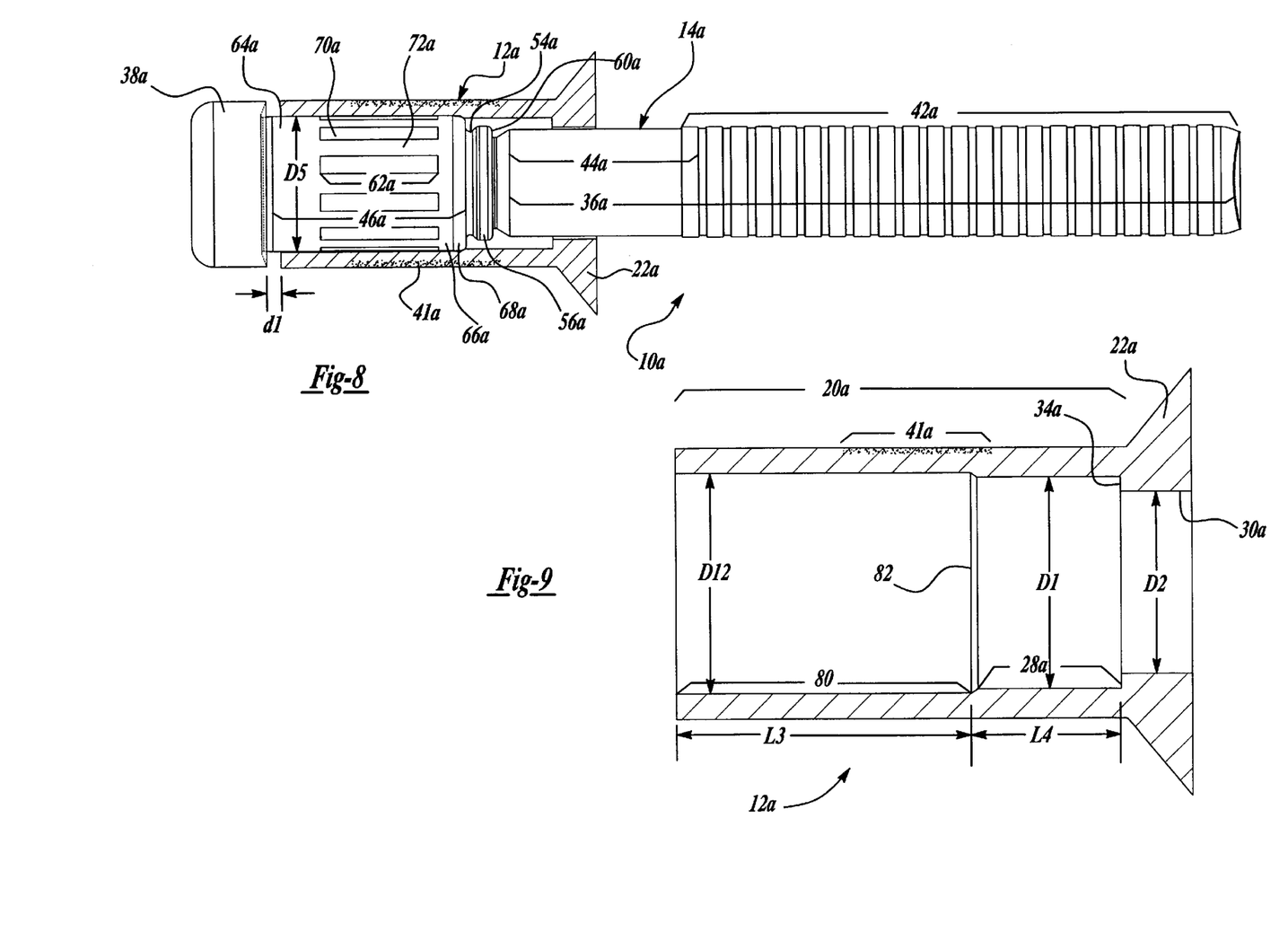
FIG. 8 is a side elevational view similar to FIG. 1 and including the pin of FIG. 1 in a pre-assembled relationship with a sleeve of modified construction.
FIG. 9 is a side elevational, sectional view to enlarged scale of the modified sleeve of FIG. 8.

A modified embodiment of another preferred form of fastener 10 is shown in FIGS. 8 and 9. In the description of the embodiment in FIGS. 8 and 9 components similar to like components in the embodiment of FIGS. 1–7 have been given the same numeral designation with the addition of the postscript letter "a" and unless described otherwise can be considered to be substantially the same. In this regard, the same designation shall be used for dimensions that are the same and unless noted otherwise the typical dimensions are the same as listed in the CHART OF TYPICAL VALUES for fastener 10. As can be seen in FIGS. 8 and 9, a blind fastener 10a, includes a hollow sleeve 12a and a pin 14a, and, in FIG. 8, is shown in a pre-assembled relationship to facilitate handling in preparation for installation of workpieces such as workpieces 16 and 18.

As will be seen the sleeve 12a is substantially the same as sleeve 12 except that sleeve 12a is provided with a counterbored portion 80 at the outer end of sleeve shank 20a. The counterbored portion 80 is of a diameter D12 which is slightly less than the diameter D5 of the expander pin portion 46a. For example with the pin 14a being dimensioned essentially the same as pin 14 and as set forth in the CHART OF TYPICAL VALUES the counterbore diameter D12 would be between around 0.150 to around 0.151 inches to provide a slight interference with a D5 of between around 0.1515 to around 0.1530 inches to facilitate pre-assembly of the pin 14a and sleeve 12a without significant sleeve shank expansion.

The counterbored portion 80 extends for a length L3 to a locating shoulder 82 at the juncture of counterbore portion 80 with the shank bore portion 28a. Here the shank bore portion 28a, while of reduced length, is the same as shank bore portion 28. Thus the pin shank 36a can be moved into the sleeve shank 20a in preassembly for the length L3 until the pin stop shoulder 52a is engaged with the locating shoulder 82. This will place the pin head 38a a slight preselected distance d1 from the end of the sleeve shank 20a to provide a visual indication of the desired pre-assembly. With this structure the smooth pin shank portion 44a can be reduced in length by the length L3 while still providing the same amount of accessibility of the shank pull portion 42a at the accessible side of the workpiece such as workpieces 16 and 18. At the same time the backside protrusion of the pin 14a at the blind side of the workpieces is reduced by the length L3 permitting use of the fastener 10a in applications having reduced blind side clearance. Also the overall length and cost of the pin 14a is reduced. Except as noted above the pin 14a is identical to pin 14 and the sleeve 12a is identical to sleeve 12.

Thus the sleeve 12a has a central through bore which includes a hole filling shank bore portion 28a, having a diameter D1, which extends generally uniformly for a length L4 of the sleeve shank 20a from the locating shoulder 82 to a point proximate to the enlarged sleeve head 22a with a generally uniform, reduced diameter bore portion 30a, of a diameter D2. The annular stop shoulder 34a is defined at the juncture of shank bore portion 28a and the reduced diameter bore portion 30a.

The sleeve shank 20a is band annealed over an intermediate section 41a to provide the gradient of reduced hardness to facilitate bulbing in the section 41a to form the blind head such as blind head 37.

Looking now to FIG. 8, the pin 14a is identical to pin 14, except for the smooth shank portion of 44a of reduced length. Thus the pin 14a has an elongated shank 36a which terminates in an enlarged pin head 38a at its rearward end; the shank 36a of pin 14a has a plurality of annular pull grooves 40a in a pull groove portion 42a at the opposite end connected to the smooth shank portion 44a. The shank 36a includes the expander pin portion 46a connected at one end to the pin head 38a.

As noted the diameter D5 of expander pin portion 46a is greater than the diameter D1 of the shank bore portion 28a to provide the predetermined amount of sleeve shank expansion during installation resulting in hole fill of the workpiece bores such as bores 24 and 26 of workpieces 16 and 18, respectively. In this regard the outside diameter D6 of the straight sleeve shank 20a is less than the diameter D7 of workpiece bores to provide the radial clearance distance d. As noted with fastener 10 the fastener 10a provides effective hole fill and fastener installation over an increased range in clearance d.

The pin head 38a is identical to pin head 38 and includes a radially inwardly, axially rearwardly tapered guide surface such as 48 which defines an annular cavity such as 50 which functions in the manner previously described.

An annular pin stop shoulder 52a, a lock pocket groove 54a, an annular land 56a, and an annular breakneck groove 60a are identical to their similarly numbered counterparts in pin 14.

The expander pin portion 46a is of a structure identical to expander pin portion 46 as shown and described in FIGS. 4, 5, 5a, 5b and 6. Thus the expander pin portion 46a comprises a grooved section 62a which is connected at one end to the pin head 38a by a first, inner smooth section 64a and at the other end to the stop shoulder 52a by a second, outer smooth section 66a. The second, outer smooth section 66a terminates in a tapered lead-in segment 68a at its outer end. The lead-in segment 68a tapers radially inwardly at the angle A4 relative to the axis X and serves the purpose previously described.

In this regard the reduced length L4 of the hole filling shank bore portion 28a is generally equal to the length L2 of the straight portion of the workpiece bores in the maximum grip or maximum total thickness Wp.

The grooved section 62a is formed to have axially extending relief grooves 70a and expander segments 72a which are identical to relief grooves 70 and expander segments 72.

Again the overall axial length L1 of the grooved section 62a is selected such as to be substantially fully in line with the straight portions of workpiece bores in the condition of maximum grip where the total thickness Wp of the workpieces is a maximum for the fastener 10a and with the length L2 of straight portions of workpiece bores being generally equal to the length L1 of the grooved section 62a. At the same time the counterbored shank portion 80 is provided to extend from the blind side surface, such as surface 39, generally for the length L3 in the minimum grip or maximum total thickness Wp condition.

The fastener 10a is adapted to be set in the same manner as fastener 10 by an installation tool and as previously described and hence the details thereof have been omitted for simplicity.

Thus after the lock pocket groove 54a has been substantially filled, movement of the pin 14a is arrested. At this point the bulbed blind head has been fully formed and is in clamping engagement with the blind side of the workpiece. Now as the relative axial force applied between the pin 14a and sleeve 12a increases a force of preselected magnitude is reached at which the pin 14a is fractured at the breakneck groove 60a and the pull groove portion 42a is removed. This then completes the installation. At the same time the secondary lock formed by the sleeve material which has flowed into the relief grooves 70a assists the primary lock by the sleeve material in the lock pocket 54a to resist loosening of the pin 14a and sleeve 12a to thereby improve the static and fatigue strength of the fastened joint.

The sleeve 12a and pin 14a can be made of the same materials noted for the sleeve 12 and pin 14. Thus, in view of the substantial identify of the pin 14a and sleeve 12a with the pin 14 and sleeve 12 as noted and the description of the only significant differences, a detailed description of the similar components has been omitted for purposes of simplicity.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A blind fastener for securing a plurality of workpieces having aligned workpiece bores comprising:

a hollow sleeve having a through bore, said sleeve having a sleeve shank and an enlarged sleeve head at one end with said sleeve shank adapted to be located in the workpiece bores with a predetermined clearance, a pin, said pin having a pin shank and an enlarged pin head, said pin shank adapted to be located within said bore of said sleeve with said pin head located at the end of said sleeve shank opposite said sleeve head, said through bore of said sleeve having an expansion bore portion in said sleeve shank and a reduced diameter bore portion proximate thereto and defining a radially inwardly extending sleeve stop shoulder at the juncture of said enlarged and reduced bore portions, said reduced diameter bore portion located generally in said sleeve head, said pin shank having an increased diameter expander pin portion having a diameter greater than the diameter of said expansion bore portion to provide a preselected interference, said pin having a pin stop shoulder portion adjacent said expander pin portion, a lock groove located proximate said pin stop shoulder, said pin head adapted to engage said sleeve shank portion and to deform the same to form a blind head opposite said sleeve head in response to a relative axial force applied between said pin and said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said expander pin portion having a grooved section with a plurality of axially extending relief grooves circumferentially separated by expander segments, said expander segments defining a generally uniform circular outer surface, said expander segments and said relief grooves being generally of the same circumferential width, said expander pin portion adapted to be moved into said expansion bore portion to expand it radially outwardly to fill the clearance between said sleeve shank and the workpiece bores with said relief grooves receiving excess material of said expansion bore portion after filling of the workpiece bores.

2. The fastener of claim 1 with said sleeve stop shoulder defining a volume sufficient to generally fill the volume defined by said lock groove.

3. The fastener of claim 1 with said relief grooves forming a secondary lock between said pin and said sleeve by the excess material of said expansion bore portion flowing into said relief grooves.

4. The fastener of claim 3 with said sleeve stop shoulder defining a volume sufficient to generally fill the volume defined by said lock groove to form a primary lock to hold said pin and sleeve together, said relief grooves forming a secondary lock between said pin and said sleeve by the excess material of said expansion bore portion flowing into said relief grooves.

5. The fastener of claim 1 with said circumferential width of said expander segments and of said relief grooves being around 16°.

6. The fastener of claim 1 with said sleeve shank being formed with a preselected hardness and having an intermediate portion formed with a gradient of reduced hardness, said intermediate portion adapted to extend past the end surface of the adjacent workpiece and to deform radially outwardly to form a blind head of bulbed configuration in response to the relative axial force applied to said sleeve shank by said pin head with said bulbed blind head formed to the end surface of the adjacent workpiece to clamp the workpieces together.

7. The blind fastener of claim 1 with the workpiece bores having at least a section defined by axially straight portions and with said fastener adapted to secure workpieces having a determinable total thickness, said grooved section having a preselected axial length to substantially coincide with the axially straight portions of the workpiece bores and to extend partially past the end surface of the adjacent workpiece whereby said relief grooves are located a limited distance past the workpiece bores to provide additional volume to receive excess material of said sleeve shank from the radial expansion in filling of the axially straight portions of the workpiece bores.

8. A blind fastener for securing a plurality of workpieces having aligned workpiece bores comprising:

a hollow sleeve having a through bore, said sleeve having a sleeve shank and an enlarged sleeve head at one end with said sleeve shank adapted to be located in the workpiece bores with a predetermined clearance, a pin, said pin having a pin shank and an enlarged pin head, said pin shank adapted to be located within said bore of said sleeve with said pin head located at the end of said sleeve shank opposite said sleeve head, said through bore of said sleeve having an expansion bore portion in said sleeve shank and a reduced diameter bore portion proximate thereto and defining a radially inwardly extending sleeve stop shoulder at the juncture of said enlarged and reduced bore portions, said reduced diameter bore portion located generally in said sleeve head, said pin shank having an increased diameter expander pin portion having a diameter greater than the diameter of said expansion bore portion to provide a preselected interference, said pin having a pin stop shoulder portion adjacent said expander pin portion, a lock groove located proximate said pin stop shoulder, said pin head adapted to engage said sleeve shank portion and to deform the same to form a blind head opposite said sleeve head in response to a relative axial force applied between said pin and said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said expander pin portion having a grooved section with a plurality of axially extending relief grooves circumferentially separated by expander segments, said expander segments defining a generally uniform circular outer surface, said expander segments and said relief grooves being generally of the same circumferential width, said expander pin portion adapted to be moved into said expansion bore portion to expand it radially outwardly to fill the clearance between said sleeve shank and the workpiece bores with said relief grooves receiving excess material of said expansion bore portion after filling of the workpiece bores, said pin having a pull portion adapted to be gripped by a tool for applying said relative axial force between said pin and said sleeve, a breakneck groove connecting said pull portion to said pin shank portion and being adapted to fracture at a preselected magnitude of said relative axial force, said breakneck groove connected with said annular lock groove by a generally uniform section of said pin shank portion, said sleeve stop shoulder located generally within the confines of said enlarged sleeve head whereby radial expansion of said sleeve is inhibited as said sleeve stop shoulder is deformed into said lock groove, said sleeve head having a preselected axial length, said breakneck groove being located a predetermined maximum axial distance from said lock groove whereby distortion of said lock groove in response to application of said preselected magnitude of said axial force is inhibited, said maximum axial distance being generally equal to said preselected axial length of said sleeve head, for finally locating said lock groove and said breakneck groove generally within the confines of said sleeve head.

9. The fastener of claim 8 with said sleeve stop shoulder defining a volume sufficient to generally fill the volume defined by said lock groove.

10. The fastener of claim 8 with said relief grooves forming a secondary lock between said pin and said sleeve by the excess material of said expansion bore portion flowing into said relief grooves.

11. The fastener of claim 8 with said sleeve stop shoulder defining a volume sufficient to generally fill the volume defined by said lock groove to form a primary lock to hold said pin and sleeve together, said relief grooves forming a secondary lock between said pin and said sleeve by the excess material of said expansion bore portion flowing into said relief grooves.

12. The fastener of claim 8 with said circumferential width of said expander segments and of said relief grooves being around 16°.

13. The fastener of claim 8 with said sleeve shank being formed with a preselected hardness and having an intermediate portion formed with a gradient of reduced hardness, said intermediate portion adapted to extend past the end surface of the adjacent workpiece and to deform radially outwardly to form a blind head of bulbed configuration in response to the relative axial force applied to said sleeve shank by said pin head with said bulbed blind head formed to the end surface of the adjacent workpiece to clamp the workpieces together.

14. The blind fastener of claim 8 with the workpiece bores having at least a section defined by axially straight portions and with said fastener adapted to secure workpieces having a determinable total thickness, said grooved section having a preselected axial length to substantially coincide with the axially straight portions of the workpiece bores and to extend partially past the end surface of the adjacent workpiece whereby said relief grooves are located a limited distance past the workpiece bores to provide additional volume to receive excess material of said sleeve shank from the radial expansion in filling of the axially straight portions of the workpiece bores.

15. A blind fastener for securing a plurality of workpieces having aligned workpiece bores comprising:

a hollow sleeve having a through bore, said sleeve having a sleeve shank and an enlarged sleeve head at one end with said sleeve shank adapted to be located in the workpiece bores with a predetermined clearance, a pin, said pin having a pin shank and an enlarged pin head, said pin shank adapted to be located within said bore of said sleeve with said pin head located at the end of said sleeve shank opposite said sleeve head, said through bore of said sleeve having an expansion bore portion in said sleeve shank and a reduced diameter bore portion proximate thereto and defining a radially inwardly extending sleeve stop shoulder at the juncture of said enlarged and reduced bore portions, said reduced diameter bore portion located generally in said sleeve head, said pin shank having an increased diameter expander pin portion having a diameter greater than the diameter of said expansion bore portion to provide a preselected interference, said pin having a pin stop shoulder portion adjacent said expander pin portion, a lock groove located proximate said pin stop shoulder, said pin head adapted to engage said sleeve shank portion and to deform the same to form a blind head opposite said sleeve head in response to a relative axial force applied between said pin and said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said expander pin portion having a grooved section with a plurality of axially extending relief grooves circumferentially separated by expander segments, said expander segments defining a generally uniform circular outer surface, said expander segments and said relief grooves being generally of the same circumferential width, said expander pin portion adapted to be moved into said expansion bore portion to expand it radially outwardly to fill the clearance between said sleeve shank and the workpiece bores with said relief grooves receiving excess material of said expansion bore portion after filling of the workpiece bores, said expander pin portion having a leading end terminating in a generally smooth tapered lead-in segment to facilitate initial movement into and initial radial expansion of said expansion bore portion of said sleeve shank, said expander pin portion having a lead expander segment with a generally uniform, continuous circular outer surface connecting said tapered lead-in segment to said grooved section, said outer surface of said lead expander segment being of substantially the same diameter as said expander segments and being of a limited axial length to facilitate radial expansion of said expansion bore portion and flow of excess material of said sleeve shank into said relief grooves.

16. The fastener of claim 15 with said sleeve stop shoulder defining a volume sufficient to generally fill the volume defined by said lock groove.

17. The fastener of claim 15 with said relief grooves forming a secondary lock between said pin and said sleeve by the excess material of said expansion bore portion flowing into said relief grooves.

18. The fastener of claim 15 with said sleeve stop shoulder defining a volume sufficient to generally fill the volume defined by said lock groove to form a primary lock to hold said pin and sleeve together, said relief grooves forming a secondary lock between said pin and said sleeve by the excess material of said expansion bore portion flowing into said relief grooves.

19. The fastener of claim 15 with said circumferential width of said expander segments and of said relief grooves being around 16°.

20. The fastener of claim 15 with said sleeve shank being formed with a preselected hardness and having an intermediate portion formed with a gradient of reduced hardness, said intermediate portion adapted to extend past the end surface of the adjacent workpiece and to deform radially outwardly to form a blind head of bulbed configuration in response to the relative axial force applied to said sleeve shank by said pin head with said bulbed blind head formed to the end surface of the adjacent workpiece to clamp the workpieces together.

21. The blind fastener of claim 15 with the workpiece bores having at least a section defined by axially straight portions and with said fastener adapted to secure workpieces having a determinable total thickness, said grooved section having a preselected axial length to substantially coincide with the axially straight portions of the workpiece bores and to extend partially past the end surface of the adjacent workpiece whereby said relief grooves are located a limited distance past the workpiece bores to provide additional volume to receive excess material of said sleeve shank from the radial expansion in filling of the axially straight portions of the workpiece bores.

22. A blind fastener for securing a plurality of workpieces having aligned workpiece bores with the workpiece bores having at least a section defined by axially straight portions, said blind fastener comprising:

a hollow sleeve having a through bore, said sleeve having a sleeve shank and an enlarged sleeve head at one end with said sleeve shank adapted to be located in the axially straight portions of the workpiece bores with a predetermined clearance, a pin, said pin having a pin shank and an enlarged pin head, said pin shank adapted to be located within said bore of said sleeve with said pin head located at the end of said sleeve shank opposite said sleeve head, said through bore of said sleeve having an expansion bore portion in said sleeve shank and a reduced diameter bore portion proximate thereto and defining a radially inwardly extending sleeve stop shoulder at the juncture of said enlarged and reduced bore portions, said reduced diameter bore portion located generally in said sleeve head, said pin shank having an increased diameter expander pin portion having a diameter greater than the diameter of said expansion bore portion to provide a preselected interference, said pin having a pin stop shoulder portion adjacent said expander pin portion, a lock groove located proximate said pin stop shoulder, said pin head adapted to engage said sleeve shank portion and to deform the same to form a blind head opposite said sleeve head in response to a relative axial force applied between said pin and said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said expander pin portion having a grooved section with a plurality of axially extending relief grooves circumferentially separated by expander segments, said expander segments defining a generally uniform circular outer surface, said expander segments and said relief grooves being generally of the same circumferential width, said expander pin portion adapted to be moved into said expansion bore portion to expand it radially outwardly to fill the clearance between said sleeve shank and the axially straight portions of the workpiece bores with said relief grooves receiving excess material of said expansion bore portion after filling of the axially straight portions of the workpiece bores, said sleeve stop shoulder defining a volume sufficient to generally fill the volume defined by said lock groove to form a primary lock to hold said pin and sleeve together, said relief grooves forming a secondary lock between said pin and said sleeve by the excess material of said expansion bore portion flowing into said relief grooves, said fastener adapted to secure workpieces having a determinable total thickness, said grooved section having a preselected axial length to substantially coincide with the axially straight portions of the workpiece bores and to extend partially past the end surface of the adjacent workpiece whereby said relief grooves are located a limited distance past the workpiece bores to provide additional volume to receive excess material of said sleeve shank from the radial expansion in filling of the axially straight portions of the workpiece bores.

23. The fastener of claim 22 with said sleeve shank being formed with a preselected hardness and having an intermediate portion formed with a gradient of reduced hardness, said intermediate portion adapted to extend past the end surface of the adjacent workpiece and to deform radially outwardly to form a blind head of bulbed configuration in response to the relative axial force applied to said sleeve shank by said pin head with said bulbed blind head formed to the end surface of the adjacent workpiece to clamp the workpieces together.

24. The fastener of claim 23 with said pin having a pull portion adapted to be gripped by a tool for applying said axial force, a breakneck groove connecting said pull portion to said pin shank portion and being adapted to fracture at a preselected magnitude of said axial force, said breakneck groove connected with said annular lock groove by a generally uniform section of said pin shank portion, said sleeve stop shoulder located generally within the confines of said enlarged sleeve head whereby radial expansion of said sleeve is inhibited as said sleeve stop shoulder is deformed into said lock groove, said sleeve head having a preselected axial length, said breakneck groove being located a predetermined maximum axial distance from said lock groove whereby distortion of said lock groove in response to application of said preselected magnitude of said axial force is inhibited, said maximum axial distance being generally equal to said preselected axial length of said sleeve head, for finally locating said lock groove and said breakneck groove generally within the confines of said sleeve head.

25. A blind fastener for securing a plurality of workpieces having aligned workpiece bores comprising:

a hollow sleeve having a through bore, said sleeve having a sleeve shank and an enlarged sleeve head at one end with said sleeve shank adapted to be located in the workpiece bores with a predetermined clearance, a pin, said pin having a pin shank and an enlarged pin head, said pin shank adapted to be located within said bore of said sleeve with said pin head located at the end of said sleeve shank opposite said sleeve head, said through bore of said sleeve having an expansion bore portion in said sleeve shank and a reduced diameter bore portion proximate thereto and defining a radially inwardly extending sleeve stop shoulder at the juncture of said enlarged and reduced bore portions, said reduced diameter bore portion located generally in said sleeve head, said pin shank having an increased diameter expander pin portion having a diameter greater than the diameter of said expansion bore portion to provide a preselected interference, said pin having a pin stop shoulder portion adjacent said expander pin portion, a lock groove located proximate said pin stop shoulder, said pin head adapted to engage said sleeve shank portion and to deform the same to form a blind head opposite said sleeve head in response to a relative axial force applied between said pin and said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said expander pin portion having a grooved section with a plurality of axially extending relief grooves circumferentially separated by expander segments, said expander segments defining a generally uniform circular outer surface, said expander segments and said relief grooves being generally of the same circumferential width, said expander pin portion adapted to be moved into said expansion bore portion to expand it radially outwardly to fill the clearance between said sleeve shank and the workpiece bores with said relief grooves receiving excess material of said expansion bore portion after filling of the workpiece bores, said relief grooves being of a radially shallow depth and having a generally arcuate contour smoothly blending with said generally circular outer surface of said expander segments, said relief grooves forming a secondary lock between said pin and said sleeve by the excess material of said expansion bore portion flowing into said relief grooves.

26. The fastener of claim 25 with said radial depth of said relief grooves being between around 2% to around 2.5% of the diameter of said expander pin portion.

27. The fastener of claim 25 with said expander segments having a preselected radius and with the arcuate contour of said relief grooves being generally at a radius of around one third of the radius of said expander segments.

28. The fastener of claim 25 with said radial depth of said relief grooves being between around 2% to around 2.5% of the diameter of said expander pin portion, said expander segments having a preselected radius and with the arcuate contour of said relief grooves being generally at a radius of around one third of the radius of said expander segments, said relief grooves forming a secondary lock between said pin and said sleeve by the excess material of said expansion bore portion flowing into said relief grooves.

29. The fastener of claim 25 with said sleeve shank being formed with a preselected hardness and having an intermediate portion formed with a gradient of reduced hardness, said intermediate portion adapted to extend past the end surface of the adjacent workpiece and to deform radially outwardly to form a blind head of bulbed configuration in response to the relative axial force applied to said sleeve shank by said pin head with said bulbed blind head formed to the end surface of the adjacent workpiece to clamp the workpieces together, said pin constructed of a material with a hardness of at least around 44 Rc and with said sleeve having an overall hardness of around 96 Rb and with the hardness of said intermediate portion being reduced to around 70 Rb.

30. A blind fastener for securing a plurality of workpieces having aligned workpiece bores comprising:

a hollow sleeve having a through bore, said sleeve having a sleeve shank and an enlarged sleeve head at one end with said sleeve shank adapted to be located in the workpiece bores with a predetermined clearance, a pin, said pin having a pin shank and an enlarged pin head, said pin shank adapted to be located within said bore of said sleeve with said pin head located at the end of said sleeve shank opposite said sleeve head, said through bore of said sleeve having an expansion bore portion in said sleeve shank and a reduced diameter bore portion proximate thereto and defining a radially inwardly extending sleeve stop shoulder at the juncture of said enlarged and reduced bore portions, said reduced diameter bore portion located generally in said sleeve head, said pin shank having an increased diameter expander pin portion having a diameter greater than the diameter of said expansion bore portion to provide a preselected interference, said pin having a pin stop shoulder portion adjacent said expander pin portion, a lock groove located proximate said pin stop shoulder, said pin head adapted to engage said sleeve shank portion and to deform the same to form a blind head opposite said sleeve head in response to a relative axial force applied between said pin and said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said expander pin portion having a grooved section with a plurality of axially extending relief grooves circumferentially separated by expander segments, said expander segments defining a generally uniform circular outer surface, said expander segments and said relief grooves being generally of the same circumferential width, said expander pin portion adapted to be moved into said expansion bore portion to expand it radially outwardly to fill the clearance between said sleeve shank and the workpiece bores with said relief grooves receiving excess material of said expansion bore portion after filling of the workpiece bores, said sleeve shank having an enlarged counterbore at its open end connected to said expansion bore portion by a locating shoulder, said expander pin portion adapted to be moved into said counterbore with a slight interference fit generally up to said locating shoulder for pre-assembly prior to installation.

\* \* \* \* \*